(12) United States Patent
Schuschan

(10) Patent No.: US 7,890,429 B2
(45) Date of Patent: Feb. 15, 2011

(54) METHOD FOR MANAGING A TIME-LIMITED LICENSE ON A COMPUTER APPLICATION THAT CAN BE RUN ON A NETWORK COMPONENT

(75) Inventor: Martin Schuschan, Schoenenwalde (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 106 days.

(21) Appl. No.: 11/667,426

(22) PCT Filed: Oct. 27, 2005

(86) PCT No.: PCT/EP2005/011503

§ 371 (c)(1), (2), (4) Date: May 9, 2007

(87) PCT Pub. No.: WO2006/053631

PCT Pub. Date: May 26, 2006

(65) Prior Publication Data

US 2008/0010460 A1   Jan. 10, 2008

(30) Foreign Application Priority Data

Nov. 18, 2004  (DE) .................... 10 2004 055 759

(51) Int. Cl.
*G06F 21/00* (2006.01)
(52) U.S. Cl. .................. 705/59; 705/51; 705/52; 713/176
(58) Field of Classification Search ............. 705/59, 705/51–52; 713/176
See application file for complete search history.

(56) References Cited

U.S. PATENT DOCUMENTS

| 4,924,378 A | * | 5/1990 | Hershey et al. ............... 726/29 |
| 5,014,234 A | * | 5/1991 | Edwards, Jr. .................. 726/33 |
| 5,260,999 A | | 11/1993 | Wyman |

(Continued)

FOREIGN PATENT DOCUMENTS

WO   WO 2004/075090 A   9/2004

OTHER PUBLICATIONS

Open Mobile Alliance; "Rights Expression Language, Candidate Version- Oct. 31, 2003;" 29 pages.*

*Primary Examiner*—Andrew J. Fischer
*Assistant Examiner*—Monica Mandel
(74) *Attorney, Agent, or Firm*—Laurence A. Greenberg; Werner H. Stemer; Ralph E. Locher

(57) ABSTRACT

In a method for managing a time-limited license on a computer application that can be run on a network component, a license data record is created that contains at least information concerning the computer application to be licensed, a license period and a signing time. The license data record is read from a license server, and based on the information concerning the signing time a reference date for this computer application is created. The reference date is compared with a system time, which is defined for the network component in order to determine a binding current time base for the license server. Based on this comparison, it is determined whether the computer application is run on the basis of at least one of the current time base and the granted license period. The reference date is continuously updated and stored on the license server.

6 Claims, 3 Drawing Sheets

U.S. PATENT DOCUMENTS

| | | | | |
|---|---|---|---|---|
| 5,790,664 | A * | 8/1998 | Coley et al. | 709/203 |
| 5,925,127 | A * | 7/1999 | Ahmad | 726/31 |
| 6,104,813 | A | 8/2000 | McRae | |
| 2002/0019814 | A1 * | 2/2002 | Ganesan | 705/59 |
| 2002/0169974 | A1 * | 11/2002 | McKune | 713/200 |
| 2004/0128395 | A1 * | 7/2004 | Miyazaki | 709/229 |
| 2005/0027657 | A1 * | 2/2005 | Leontiev et al. | 705/59 |
| 2006/0294017 | A1 * | 12/2006 | Kim et al. | 705/59 |

\* cited by examiner

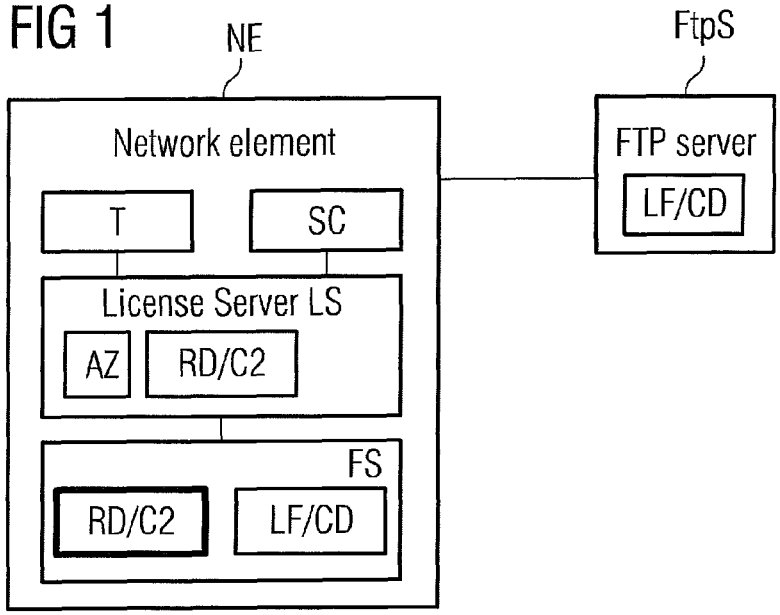
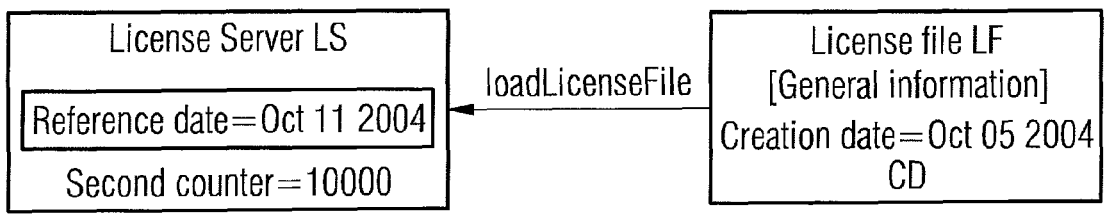
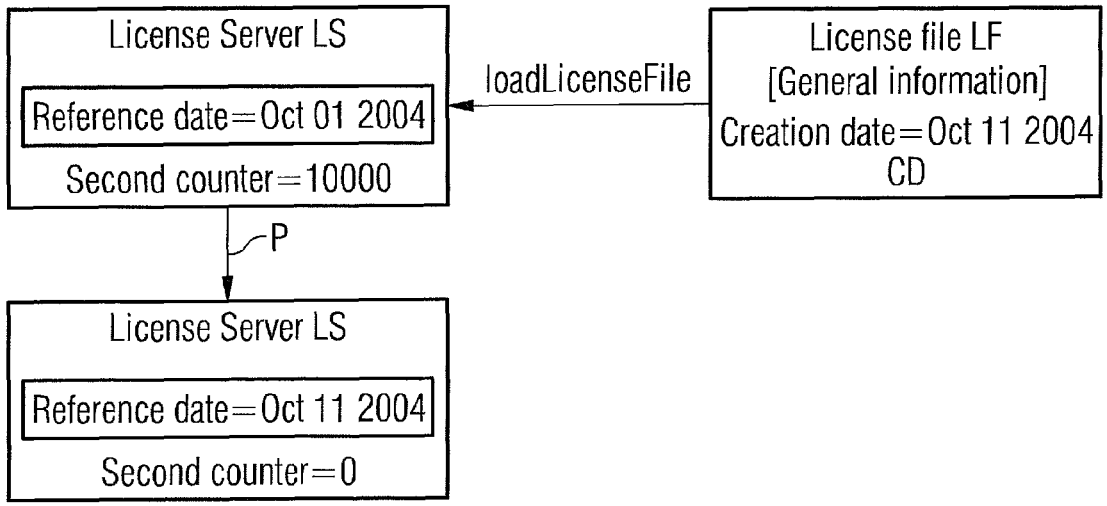

| Keyword | | | Variable | Example |
|---|---|---|---|---|
| Explanatory notes | | | | License file. Do not edit this file |
| General information | | | File id | 01 00 01 02 00 00 00 03 |
| | | | Customer name | customerName1 |
| | | | Product name | productName1 |
| | CD | | Signature info | 00 01 00 02 |
| | | | Creation date | Jan 01 2003 |
| MAC address | | | Id | 01 02 03 04 05 06 |
| | MAC address list | | Id | 01 02 03 04 05 06 |
| | | | Id | 01 02 03 04 05 07 |
| | | | Id | 01 02 03 04 05 08 |
| | | Project | Name | projectName1 |
| | | | | |
| Warranty period | | | Expiration date | Feb 23 2003 |
| Lock network element | | | Expiration date | Jan 01 2004 |
| License keys | | | Feature info | featureInfo1 |
| | | | Feature id | 00 00 00 01 |
| | | | | |
| | | | Locking mode | 01 |
| | | | Start | Jun 05 2003 |
| | | | End | Jul 09 2003 |
| | | | Feature info | featureInfo2 |
| | | | Feature id | 00 00 00 02 |
| | | | | |
| Digital signature | | | Id | e2 e0 5f 14 21 5f cf 41 7b 0f |
| | | | Id | 3f 5a 69 0a 03 5d 2e 2a be 3f |

FIG 4

LF (0001)   [Explanatory notes]
(0002)   Test license file. Do not edit this file.
(0003)
(0004)   [General information]
(0005)   File id           = 02 01 00 01
(0006)   Customer name = System Test
(0007)   Product name   = hi
(0008)   Signature info   = 01 01 00 01
(0009)   Creation date    = Feb 04 2004  ← CD
(0010)
(0011)   [MAC address list]
(0012)   Id = 01 02 03 04 05 06
(0013)
(0014)   [License keys]
(0015)   Feature info  = hiX
(0016)   Feature id    = 00 00 00 01
(0017)
(0018)   Feature info   = voice traffic
(0019)   Feature id     = 00 00 00
(0020)   Quantity       = 12
(0021)   Locking mode = 01
(0022)   Start          = Jun 01 2004  ⎫
(0023)   End            = Jun 15 2004  ⎬ LP
(0024)
(0025)   [Digital signature]
(0026)   Id = 01 02 03 04 05 06 07 08 09 0a
(0027)   Id = 01 02 03 04 05 06 07 08 09 0a

METHOD FOR MANAGING A TIME-LIMITED LICENSE ON A COMPUTER APPLICATION THAT CAN BE RUN ON A NETWORK COMPONENT

BACKGROUND OF THE INVENTION

The present invention relates to a method for managing a time-limited license on a computer application that can be run on a network component.

Modern data processing networks, such as for instance telecommunication networks, generally have network components which are linked to one another in a very complex manner. These network components have the most varied of tasks and must thus be able to be universally configured in order to be able to be used in telecommunication with different time-slot oriented and packet-oriented transmission methods for instance. In addition, it is also necessary to adapt specific network components to the different license agreements, which a subscriber can conclude with a network operator.

Aside from the partially proprietary hardware in these networks, software applications also primarily ensure that specific administratively activatable functionalities can be provided and used with specific network components.

The provision of these functionalities is very frequently subject to an initially general utilization limitation, which can be overridden by acquiring a generally time-limited utilization license on a desired computer application. One particular problem with the management of the utilization license duration is the often temporal limitation of the utilization license. The option of intervening in the ongoing operation of the network is frequently no longer possible for the supplier of the computer application, so that improper further use of the computer application can not be excluded once the utilization license has expired. Attempts by determining a license finish date to initiate deinstallation of the application when the license finish date is reached and thus to be able to rule out further use can be circumvented by a comparatively simple manipulation of the relevant time base, with which the license finish date is compared.

SUMMARY OF THE INVENTION

The object underlying the present invention is thus to specify a method for managing a time-limited license on a computer application that can be run on a network component, with which it is ensured that a computer application is reliably rendered unavailable for continued-unauthorized use once the duration of the license has expired.

This object is achieved in accordance with the invention by a method for managing a time-limited license on a computer application that can be run on a network component, with which;

a) a license data record is created that contains at least the information concerning the computer application to be licensed, a license period and a signing time;
b) the license data record is read from a license server, and based on the information concerning the signing time, a reference date is determined for this computer application;
c) the reference date is compared with a system time, which is defined for the network component, in order to determine a binding current time base for the license server;
d) based on this comparison, it is determined whether the computer application is run on the basis of the current time base and/or on the basis of the granted license period, whereby
e) the reference date is continuously updated and stored on the license server.

In this manner, the inventive method, together with the license server that, itself, can be run on the network component, enables, based on the determination of the reference date and based on the continuous updating thereof, a creation of the time base, which is independent of the system time and against which the assured license period can be evaluated.

An expedient embodiment of the invention allows the license data record also to contain a digital signature, with which it is possible to ensure that only the owner of the signature key is also able to monitor the data of the license data record in terms of its integrity and thus to prompt the execution of the licensed computer application. Provision can hereby further be made for the license data record to be read from the license server cyclically or on the basis of an event trigger. The cyclical evaluation of the license data record can thus be advantageous in that an updating or an extension of the license duration can be automatically perceived by the license server without additional measures. In a development of the invention, the signing time can only be used for determining the reference date after a successful signature check.

The determination and the updating of the reference date are naturally particularly important to the course of the method according to the invention because this reference date constitutes the central information for determining the current time basis, against which other time data is evaluated. In a preferred embodiment of the invention, the license server can thus access the system time as the current time base, if the comparison of the system time with the previously determined reference date produces the result that the system time is more recent than or equal to the reference date. This ensures that the time base of the license server is on the, as it were, most recent time base allowing for the previous condition. Accordingly, in a further advantageous embodiment of the invention, the procedure can be reversed, i.e. the reference date is used to determine whether the license period has not yet expired, without adaptation to the system time as the current time base of the license server, if the comparison of the system time with the previously determined reference date produces the result that the system time is older than the previously determined reference date. This reliably rules out the possibility of the computer application being utilized if the system time is frozen or even set back, because the system time can then still be located within the license period but the reference date, which is then also updated, is after the end of the assured license duration.

In order to ensure a secured independency during the updating of the reference date, provision can be made in a further preferred embodiment of the invention to assign a counter to the network component in order to update the reference date, the counter reading of said counter being added to the reference date continuously or discontinuously. It is then also advantageous for the same reasons as mentioned above to store the updated reference date on the network component in a protected mode and thus also to rule out an improper manipulation in a more effective manner.

Further advantageous embodiments of the present invention will emerge from the remaining subclaims.

BRIEF DESCRIPTION OF THE SEVERAL VIEWS OF THE DRAWINGS

The invention is described in more detail below with reference to the drawing for instance, in which;

FIG. 1 shows a schematic diagram of a network element having a license server and an ftp server;

FIGS. 2A and 2B show a schematic diagrams of the procedure for monitoring and updating the reference date RD;

FIG. 3 shows a schematic diagram of a typical structure of a license data record, and FIG. 4 shows an example of a license data record.

DETAILED DESCRIPTION OF THE INVENTION

FIG. 1 shows a schematic diagram of a network element NE, which is arranged in a communication network (not shown here in further detail), and an FTP server FtpS arranged on the user side. A licenser sends a user a license data record LF (by email for instance), which: the user is then able to store on their FTP server FtpS. This license data record LF contains inter alia a binding signing time, subsequently referred to as creation date CD. This creation date CD can hereby specify the signing time of the license data record LF. FIGS. 3 and 4 subsequently provide detailed information concerning the precise content of the license data record LF.

Aside from the conventional functionalities, the network element NE also comprises a license server LS and a data record server FS as well as a timer T and a system clock SC. The license server LS hereby maintains a reference date RD and a second internal time base C2 for determining a current time base AZ. The license server LS also has the task of managing the licenses granted in the license data record LF and the reference date RD as well as controlling the registered computer applications accordingly. The data record server FS provides the file management for the license data record LF with the creation data CD and provides the reference date RD with the second internal time base C2.

FIG. 2 shows a schematic diagram of the procedure for monitoring and updating the reference date RD, which is still of central importance for determining whether the user is still authorized to use a specific computer application. To this end the license server LS reads the license data record LF and first checks the signature of the license data record LF. After determining the positive authorization, the creation date CD contained in the license data record LF is then used to determine the initial reference date RD, which is shown in part a) for the case, in which the creation date CD, here for instance Oct. 5, 2004, is older than the current reference date RD, here for instance Oct. 11, 2004, having an additional value of 10.000 for instance in the second internal time base C2 (second counter), which is of importance for the continuous updating of the reference date. Because the creation date CD is older here than the reference date RD, the reference date RD is left unchanged for the license server LS and the count value of the second internal time base C2 is added to this reference date RD.

The part b) of FIG. 2 shows precisely the other case, in which the creation date CD is more recent than the reference date RD. An arrow P is now intended to represent the method step, which consists in equating the reference date RD with the creation date CD and in setting the counter status of the second internal time base C2 to zero. The current time base AZ for the license server LS then results from the comparison of the system time SC with the reference date RD. An updating of the reference date RD therefore does not necessarily also have to result in a change in the current time base AZ.

The count value of the second internal time base C2 is now continuously added to the reference date on the basis of the reading of the license data record LF and on the basis of an authorized utilization. If the count value has now reached the figure of 86400 seconds (24 h*60 min*60 sec) for instance, the reference date RD is now increased by one day and the count value is reduced by 86400. This allows the reference date RD and the value of the second internal time base C2 to be stored cyclically in the data record server FS, with the storage interval being able to be defined after measurement. The storage takes place on the network element NE with a restricted write/read access.

The next important comparison for the determination of authorization is the comparison of the initially determined and continuously updated reference date RD with the system time according to the system clock SC. This system clock SC can be predetermined by the operator of the network element NE, as a result of which the license server LS compares the system time with the reference date RD. The reference date RD impacts on the license server LS as a limit for the time of the system clock SC, subsequently referred to as system time SC. If the system time SC is now more recent than or equal to the reference date RD, the system time SC is used as the current time base AZ for the license server LS, i.e. the license server LS uses this time base for the further check concerning a possible expiry of the license duration. If the system time SC is older than the reference date, the reference date RD remains significant to the current time base AZ of the license server LS and thus for the further authorization check.

A typical structure of a license data record LF is shown schematically in FIG. 3. This license data record LF comprises details of all licenses and is protected by a signature. This license data record LF is created for a specific network NE or for a specific network having a number of network elements NE and in the present instance also contains a MAC address and/or a MAC address list for identifying the hardware used.

According to the explanatory notes, the license data record LF specifically contains general information such as the unique ID of the license data record (file id), the customer name, the designation of the product (product name), information relating to the signature (signature info) and the all important creation date CD, which corresponds to the date of the signing of the license data record LF.

This is followed by information relating to the MAC address, the MAC address list and the project name, with an entry under the MAC-address only allowing a specific network element NE to run the licensed computer application. Accordingly the entries in the MAC address list are the network components listed there.

The next data block concerns the actual license. The term "Feature info" specifies the name/designation of the licensed software. The term "Feature id" is a unique ID code for the licensed computer application. An entry in "Locking mode" is used to control the behavior of the license server LS after the expiry of a time-limited license, such as for instance the generation of alarms, the blocking of the computer application or the deinstallation thereof. The fields "Start" and "End" are self-explanatory and define the validity period of the license, in other words the license period LP. A time-limited licensed computer application can thus then only be run if the current time base AZ is in the license period LP defined by the fields "Start" and "End". A license data record LF written using software is illustrated by way of example in FIG. 4.

The specific setting of the reference date RD and its updating herewith ensures that a time base obtained independently of the operator of the network element NE is always available to the license server LS, against which time base the allowed license period can be evaluated. Improper or unauthorized (further) use of the time-limited licensed computer application can be avoided in this manner.

The invention claimed is:

1. A method for managing a time-limited license on a computer application that can be run on a network component, comprising:

creating a license data record that includes at least information concerning the computer application to be licensed, a license period and a signing time;

reading the license data record from a license server, and based on the information concerning the signing time determining a reference date for the computer application;

comparing the reference date with a system time, which is defined for the network component in order to determine a binding current time base for the license server;

based on the comparison, determining whether the computer application is run on the basis of at least one of the current time base and the granted license period;

continuously updating the reference date and storing it on the license server;

equating the current time base for the license server with the system time, if the comparison of the system time with the previously determined reference date produces the result that the system time is more recent than or equal to the reference date; and using the reference date for a determination as to whether the license period has still not expired, as the current time base for the license server without adaptation to the system time, if the comparison of the system time with the previously determined reference date produces the result that the system time is older than the previously determined reference date.

2. The method of claim 1, wherein the license data record also features a digital signature.

3. The method of claim 1, further comprising reading the license data record from the license server cyclically or on the basis of an event trigger.

4. The method of claim 2, wherein the signing time is only used to determine the reference date after a successful signature check.

5. The method of claim 1, wherein a counter is assigned to the network component for updating the reference dates, a counter status of said counter being added to the reference date continuously or discontinuously.

6. The method of claim 1, wherein the updated reference date is stored on the network component in a protected mode.

* * * * *